March 28, 1944.  D. PERLUSZ ET AL  2,345,146
DEVICE FOR EXTRACTING COFFEE AND/OR TEA
Filed March 7, 1939  2 Sheets-Sheet 1
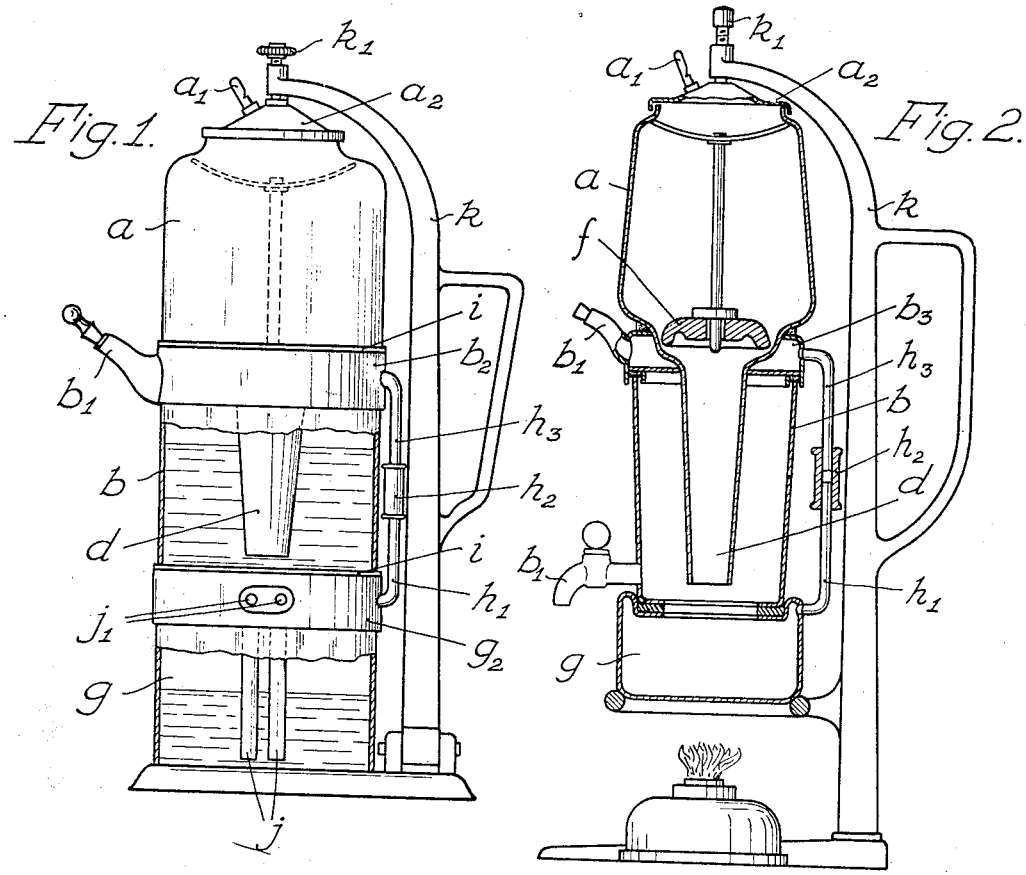

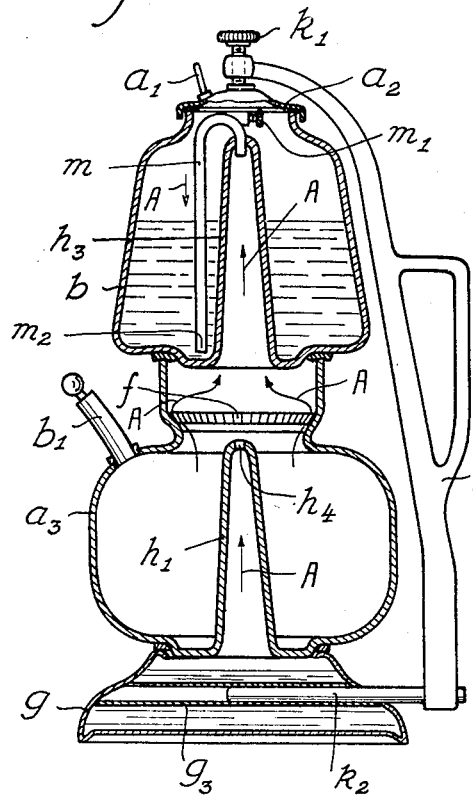
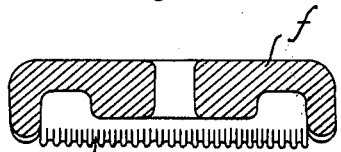
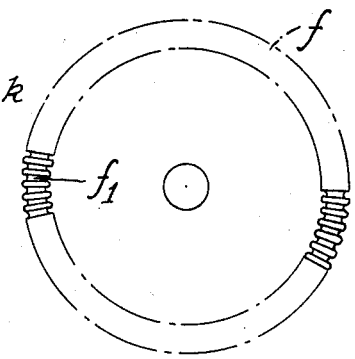
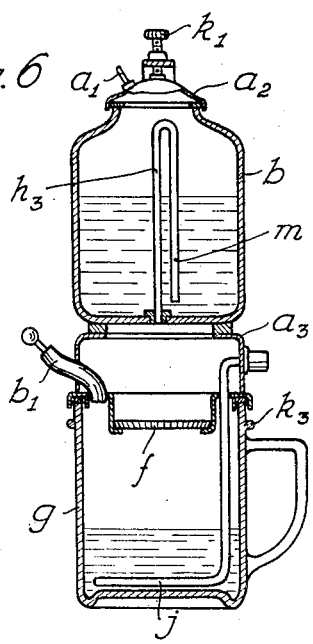
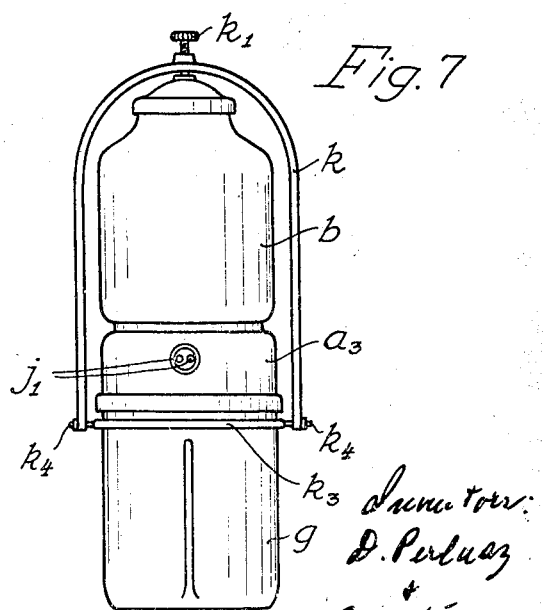

Patented Mar. 28, 1944

2,345,146

UNITED STATES PATENT OFFICE 2,345,146

DEVICE FOR EXTRACTING COFFEE AND/OR TEA

Desider Perlusz and Ernest Balázs, Budapest, Hungary; vested in the Alien Property Custodian Application March 7, 1939, Serial No. 260,412
In Yugoslavia April 20, 1938

8 Claims. (Cl. 99—292)

The invention relates to improvements in devices for extracting coffee and/or tea, comprising a container for the supply of extraction water and a strainer on which the coffee or tea to be extracted is supported in such a manner as to keep the said substances separated from the said supply of water before extraction occurs.

According to the invention the device for extracting coffee and/or tea comprises means enabling the extraction water to be brought to boiling by the heat of steam.

The advantage offered by the invention consists in the fact that the container for the supply of extraction water in case it is made of glass need not be made of fire-proof glass which is expensive, and the shaping and working of which is difficult, but may be made of ordinary kinds of glass such as may be manufactured in any glass factory. A further advantage results from the fact that heating by means of steam will cause the water in the water container and intended to be used for extracting coffee and/or tea to be heated in a gradual manner and under the most favourable conditions.

According to a particular embodiment of the invention, the device for extracting coffee and/or tea comprises means adapted for the direct introduction of steam into the interior of the container for the said supply of extraction water, this being done preferably in such a manner that the said means issue into the said container above or, preferably, below the level of the supply of extraction water. Consequently, the resultant coffee or tea decoction will not suffer a disadvantageous change of flavour, i. e. will not assume a so-called metallic flavour even in case the generation of steam is effected electrically by means of members placed directly into the water. Another advantage consists in that heating the extracting water by means of steam introduced directly into said water will improve the quality of the ordinary water used for extracting, owing to the fact that the said steam, becoming recondensed in the extracting water, is converted into distilled water.

The invention will be explained in greater detail with reference to the various embodiments shown by way of example on the drawings.

Figs. 1 and 2 are side elevations, partly in section, each showing one embodiment of the invention. Fig. 3 is a view from below of a strainer to be inserted into the device, and Fig. 4 is a section belonging to Fig. 3. Figs. 5 and 6 are side elevations, partly in section, each showing a further embodiment of the invention; Fig. 7 is a side elevation belonging to Fig. 6.

On all of said figures corresponding parts are denoted by identical letters of reference.

On Fig. 1 $a$ denotes the container where extraction takes place, and $b$ is the container to be filled partly with the supply of extraction water; container $b$ is arranged below the extraction container $a$ and a rising pipe $d$ extends into the water space of container $b$. At the top of pipe $d$ is inserted a strainer $f$ shown more detailed in Figs. 2, 3 and 4. The said strainer is preferably made of a pressed glass disc into the periphery of which serrations $f_1$ are pressed which are of such depth that whilst the water is able to flow through them from the container $b$ into the container $a$ and vice-versa, the said serrations nevertheless produce the desired strainer effect as against the particles of tea and coffee. By making the disc $f$ from such pressed glass instead of polished glass manufacture is rendered substantially easier and less expensive.

According to Fig. 1, a steam generating container $g$ is provided below the water container $b$. The steam generated in the container $g$ passes through the steam discharge pipe constituted by three parts $h_1$, $h_2$, $h_3$ assembled to form a single pipe line as shown, and the steam is introduced into the container $b$ above the level of the water contained in the latter.

We prefer to place the three containers $a$, $b$ and $g$ loosely above each other and to press them mutually against each other by a yoke $k$ made of metal and shaped so as to serve as a handle, the containers being fixed and held together by means of a screw $k_1$ inserted in the top of said yoke $k$ and pressing against the cover $a_2$ of said upper container $a$, the said cover being preferably made of metal. This will enable the decoction after its preparation has been completed to be poured out from the container $b$ through the pipe branch or spout $b_1$ without having to dismantle the apparatus, which dismantling (apart from the complication of handling) might be disadvantageous owing to the fact that the substances imparting its aroma to the decoction might be lost by volatilizing away.

All three containers $a$, $b$, $g$ are preferably made of glass but it is advantageous to apply on the top of the steam generating container $g$ and the water container $b$ a metal border $g_2$ and $b_2$, respectively. The steam generating container $g$ as shown in Fig. 1 is adapted for being heated electrically for which purpose we prefer to employ an electric heating system comprising electrodes $f$, into which the current is led through terminals $f_1$.

During the preparation of the decoction, the spout pipe $b_1$ provided on the bordering metal ring $g_2$ is closed by a stopper. The containers $b$ and $g$ are preferably made open on their top and they are closed merely by assembling the device through the container to be situated above them. Between two containers to be assembled in the manner shown we prefer to interpose a packing ring $i$.

The parts $h_1$ and $h_3$ of the steam discharge pipe $h_1$, $h_2$, $h_3$ are preferably made of metal. The said pipe branches $h_1$ and $h_3$ may be soldered to the bordering metal rings $g_2$ and $b_2$, respectively, and are connected by means of a small rubber pipe $h_2$ drawn on them.

The device has to be handled and operates in the following manner:

The steam-generating container $g$ is filled with water to about one-half, and the container $b$ is filled with water to about three-quarters of its total volume. Following this the containers $a$, $b$ and $g$ are placed on each other and united by means of the yoke $k$ as shown in Fig. 1. Thereupon, heating is started which can be done by means of electric current as mentioned. The steam generated in the container $g$ passes through the pipe $h_1$, $h_2$, $h_3$ into the middle water tank $b$ in which the cold water will at first absorb the steam streaming in. As soon as the water has become heated in the central container $b$, the steam pressure produced will force the water through the rising pipe $d$ upwards into the extraction container $a$ and through the layer of tea or ground coffee which has previously been placed on the strainer $f$. The steam will now be absorbed by the water until the latter reaches a temperature of about 100° C. As soon as the said temperature has been reached the excess steam will blow out through the pipe or valve $a_1$ which is mounted on the top of the extraction container $a$ and is adapted, in a manner known per se, to indicate the discharge of the steam acoustically in the manner of a whistle whereby the completion of the process of decoction is indicated in an audible manner. In case of Fig. 1 all the containers can be made of ordinary non-fireproof glass.

The embodiment shown in Fig. 2 differs from the embodiment according to Fig. 1 by the fact that heating of the steam-generating container $g$ is effected by means of a spirit lamp. Another difference consists in that the spout $b_1$ is not applied to the water container $b$ itself or a bordering metal ring $b_2$ fixed thereto, a separate ring $b_3$ being inserted between containers $a$ and $b$ provided, on one side, with said spout $b_1$ and, on the other side, with a pipe branch $h_3$ to pass the steam generated in container $g$ into the container $b$. The said ring $b_3$ may be made of glass or metal as desired, the advantage of the arrangement shown in Fig. 2 consists in that the water container $b$ may be constituted by an ordinary drinking glass or a coffee or tea cup. As shown in Fig. 2, a spout $b_1$ may be provided at the bottom of the water container $b$.

Fig. 5 illustrates an ambodiment in which the pipe branches $h_1$ and $h_3$ shown in Figs. 1 and 2 through which the steam is discharged from the steam-generating container $g$ are arranged inside the device so as to extend upward inside the containers $a_3$ and $b$, respectively, like a pillar. Moreover, according to Fig. 5, the container $b$ containing the extraction water is arranged on top whilst the container $a_3$ containing the strainer $f$ is arranged in the middle. The strainer $f$ is inserted between the steam pipe branches $h_1$ and $h_3$ into the path of flow of the steam. The lower steam pipe branch $h_1$ ends at the top below the strainer $f$, in the immediate vicinity of the latter, and is formed here with a discharge opening $h_4$, whereas the upper steam pipe branch $h_3$ leads into a pipe $m$ bent back and ending, at its lower opening $m_2$, in the vicinity of the bottom of the container $b$ below the level of water in said upper container $b$. The said arrangement results in a pipe line having a syphon effect as will be explained in greater detail below. In order to enable the pipe $m$ to be cleaned, we prefer to make the said pipe of a separate piece which is inserted into the steam pipe branch $h_3$. We further prefer to make the free throughflow cross-section of the pipe $m$ adjustable, for instance by means of a screw spindle $m_1$.

The apparatus shown in Fig. 5 operates in the following manner:

The steam generating container $g$ is heated in any desired manner, e. g. by placing it directly on a gas heater, or by means of a spirit lamp, or by means of a built-in electric device, etc., and the steam generated therein flows over the path indicated by the arrows A into the extraction water placed in the container $b$, thereby gradually heating the said water and finally causing it to boil, which latter condition may be recognised, among other indications, also by the fact that the steam flowing out through the whistle $a_1$ will give an audible acoustic signal. As soon as this occurs, the heating of the steam-generating container $g$ is discontinued. The steam, accumulating during heating in the container $a_3$ also, will, owing to the cooling taking place after the discontinuation of the heating, become condensed and in consequence thereof a vacuum will be set up in the container $a_3$, by which vacuum the hot extraction water will be drawn down from the container $b$ through the syphon pipe line $m$, $h_3$ into the container $a_3$ and during its passage the hot water will parboil the coffee or tea placed on the strainer $f$. The flow of the water through the syphon pipe $m$, $h_3$ will continue as long as the lower outlet opening $m_2$ of the pipe $m$ is below water. The decoction accumulates in the container $a_3$ and can be poured out through the spout $b_1$. In order to facilitate this, we employ the yoke $k$ shaped as a handle already described in connection with Fig. 1. According to Fig. 5, the said yoke $k$ may be supported by means of its extension $k_2$ in a rotatable manner in a pipe $g_3$ soldered into the steam-generating container $g$, preferably made of metal, so that for the purpose of dismantling the device, after loosening the screw $k_1$, the said yoke $k$ can be tilted aside.

We prefer to make the containers $a_3$ and $b$ of glass although they may also be made of metal. We further prefer to make the said steam pipe branches $h_1$ and $h_3$ integral with the containers $a_3$ and $b$, respectively.

The embodiment according to Fig. 5 is suitable for the production of a decoction of coffee and tea of the highest possible quality, because it is only once from above that the coffee or tea placed on the strainer $f$ is parboiled by water at boiling temperature, whereas, e. g. in case of Fig. 1, the water passes through the layer of coffee or tea twice which may result in such flavouring substances also being extracted as may not suit everyone's taste. Moreover, the device according to Fig. 5 is also highly suitable for the production of a mixture of coffee and milk, because the milk which, as well known, is not well suitable for parboiling coffee or tea, may be placed previously in the container $a_3$ where it will become mixed with the decoction prepared only with the aid of the water contained in the container $b$, the said mixing taking place only after the decoction has been already effected.

Figs. 6 and 7 illustrate a type of device comprising container $b$ for the supply of extraction water fitted with a syphon pipe $m$, $h_3$ similar to that shown in Fig. 5. In case of Figs. 6 and 7, however, the container $a_3$ containing the strainer $f$ is not fitted with a bottom as in the case of Fig. 5 rendering the said container $a_3$ suitable for the collection of the ready decoction. Accordingly, in the case of Figs. 6 and 7, the ready decoction passing the strainer $f$ flows into the steam generating container $g$ itself. The method of operation of the device shown in Figs. 6 and 7 is, accordingly, in principle, similar to that explained in connection with Fig. 5, a difference existing only in so far that in the case of Figs. 6 and 7 it is in the steam-generating container $g$ itself that the completed coffee or tea decoction accumulates. The clamping yoke or handle $k$ is in this case capable of being tilted around the journals $k_4$ of the metal ring $k_3$ surrounding the container $g$, as clearly shown in Fig. 7.

What we claim is:

1. Brewing apparatus of the vacuum type for extracting coffee, tea or the like, wherein water at extracting temperature is passed through a strainer as well as through material thereon to be extracted and into a receptacle for collecting the resultant brew by the action of a vacuum created within the apparatus, comprising three containers detachably superposed in steam-tight relationship, one of said containers being a steam-generating container, a second being a container for the supply of extracting water, and the third being a container for the material-supporting strainer, said strainer and the material thereon to be extracted being initially out of contact with said extracting water, means for passing steam generated in said generating container into the interior of the container for the supply of extraction water whereby the temperature of said water may be raised to extraction temperature and then a vacuum for displacing the heated water from the last-named container into and through the strainer container may be created, and means for collecting the resultant extract or brew.

2. Apparatus as defined in claim 1, said steam-generating container being arranged below the container for the supply of extracting water.

3. Apparatus as defined in claim 1, said container for the strainer being arranged between the steam-generating container and the container for the supply of extracting water.

4. Apparatus as defined in claim 1, said last-named means being integral with the container for the strainer.

5. Apparatus as defined in claim 1, at least one of said three containers being open at the top and being closed in the assembled device by the container superposed thereon.

6. Apparatus as defined in claim 1, the steam pipe line for passing the steam from the steam-generating container into the container for the supply of extracting water being arranged interiorly of the said container.

7. Apparatus as defined in claim 1, the steam pipe line for passing the steam from the steam-generating container into the container for the supply of extracting water comprising at least one pipe branch projecting upwardly into the interior of one of the containers, the said pipe being integral with the said container.

8. Apparatus as defined in claim 1, the means for passing the steam from the steam-generating container into the container for the supply of extracting water being arranged interiorly of the containers, the strainer being inserted intermediately of said means, thereby causing the steam to penetrate through the material to be extracted.

DESIDER PERLUSZ.
ERNEST BALÁZS.